(12) United States Patent
Lee et al.

(10) Patent No.: US 11,205,417 B2
(45) Date of Patent: Dec. 21, 2021

(54) APPARATUS AND METHOD FOR INSPECTING SPEECH RECOGNITION

(71) Applicant: LG ELECTRONICS INC., Seoul (KR)

(72) Inventors: Sung Rock Lee, Seoul (KR); Yongchul Park, Seoul (KR); Minook Kim, Seoul (KR); Siyoung Yang, Seoul (KR); Juyeong Jang, Seoul (KR); Sungmin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 16/572,955

(22) Filed: Sep. 17, 2019

(65) Prior Publication Data

US 2020/0013388 A1 Jan. 9, 2020

(30) Foreign Application Priority Data

Jul. 5, 2019 (KR) .......................... 10-2019-0081289

(51) Int. Cl.
  *G10L 15/01* (2013.01)
  *G10L 25/18* (2013.01)
  (Continued)

(52) U.S. Cl.
  CPC .............. *G10L 15/01* (2013.01); *G10L 13/02* (2013.01); *G10L 15/22* (2013.01); *G10L 25/18* (2013.01)

(58) Field of Classification Search
  CPC ......... G10L 13/00; G10L 13/02; G10L 13/08; G10L 15/01; G10L 15/22; G10L 15/26; G10L 25/18
  See application file for complete search history.

(56) References Cited

U.S. PATENT DOCUMENTS 6,151,576 A * 11/2000 Warnock ................. G10L 15/26
  704/235
7,103,542 B2 * 9/2006 Doyle ..................... G10L 15/01
  704/231

(Continued)

FOREIGN PATENT DOCUMENTS

CN       106548772 A  *  3/2017  ............ G10L 15/01
KR    10-2013-0051278 A    5/2013
KR       10-1819459 B1     1/2018

*Primary Examiner* — Abul K Azad
(74) *Attorney, Agent, or Firm* — Birch, Stewart, Kolasch & Birch, LLP

(57) ABSTRACT

Disclosed are a speech recognition verification device and a speech recognition verification method, which verify speech recognition results by executing artificial intelligence (AI) algorithms and/or machine learning algorithms in a 5G environment connected for Internet-of-Things. According to an embodiment, the speech recognition verification method includes converting a verification target text item to a verification target spoken utterance by applying a preset utterance condition, analyzing the verification target spoken utterance and outputting a recognition result text item corresponding to an analysis result, and verifying speech recognition performance through comparison between the verification target text item and the recognition result text item. According to the present disclosure, the speech recognition result may be verified objectively by using a spoken utterance generated with random text and various utterance conditions as input of speech recognition.

15 Claims, 4 Drawing Sheets

(51) Int. Cl.
*G10L 15/22* (2006.01)
*G10L 13/02* (2013.01)

(56) References Cited

U.S. PATENT DOCUMENTS

| | | | | |
|---|---|---|---|---|
| 2004/0015351 A1* | 1/2004 | Gandhi | .................. | G10L 15/01 704/240 |
| 2007/0016421 A1* | 1/2007 | Nurminen | ............... | G10L 13/08 704/260 |
| 2013/0268270 A1* | 10/2013 | Jiang | ....................... | G10L 15/07 704/236 |

* cited by examiner

APPARATUS AND METHOD FOR INSPECTING SPEECH RECOGNITION

CROSS-REFERENCE TO RELATED APPLICATION

This present application claims benefit of priority to Korean Patent Application No. 10-2019-0081289, entitled "APPARATUS AND METHOD FOR INSPECTING SPEECH RECOGNITION" and filed on Jul. 5, 2019, in the Korean Intellectual Property Office, the entire disclosure of which is incorporated herein by reference.

BACKGROUND

1. Technical Field

The present invention relates to a speech recognition verification device and a speech recognition verification method, and more specifically, to a device and a process for speech recognition verification, in which speech recognition is performed using an arbitrary text and various utterance conditions as input, and speech recognition results may be verified through comparison between the text used as input for speech recognition and the text being outputted as a result of speech recognition.

2. Background

Speech consists of meaningful sounds made by humans as the most natural means by which we humans communicate, convey information, and realize language.

As there have been many continuous attempts since long ago to realize the communication between humans and machines through speech, in recent years, remarkable advances have been made in the field of speech information technology (SIT), permeating many aspects of daily life. Speech recognition, which is one included in SIT technology, recognizes a spoken utterance and converts the spoken utterance to a text string. To verify the speech recognition function, utterances of a designated text by multiple speakers are recorded, and through recognition of the recorded utterances, a speech recognition rate may be measured.

Related Art 1 describes a system and an apparatus for speech recognition which support a speech recognition error correction, wherein in recognizing speech and converting the same to text, an input state is displayed in real time and a convenient correction is enabled.

Related Art 2 describes a personalized text-to-speech (TTS) feature in which characteristics are extracted from the voice of an individual and stored, and when a text is received from said individual, said text is outputted in a specified voice.

Related Art 1 and Related Art 2 disclose a technology which receives speech and converts them to text for providing services corresponding thereto, but this technology is still prone to speech recognition errors due to distortions in the tone and/or pronunciations in user's utterances, and Related Art 1 and Related Art 2 do not disclose a technique for converting an utterance received at the beginning of speech recognition processing to a voice actor's utterance so as to reduce the occurrence of speech recognition errors.

The background art described above may be technical information retained by the present inventors in order to derive the present disclosure or acquired by the present inventors along the process of deriving the present disclosure, and thus is not necessarily a known art disclosed to the general public before the filing of the present application.

RELATED ART DOCUMENTS

Patent Documents

Related Art 1: Korean Patent Registration No. 10-1819459 (published on Jan. 17, 2018)
Related Art 2: Korean Patent Laid-Open Publication No. 10-2013-0051278 (published on May 20, 2013)

SUMMARY OF THE INVENTION

One aspect of the present disclosure is to address the failure of the related art to objectify speech recognition verification due to using limited text and speaker's speech recording result as input for speech recognition.

Another aspect of the present disclosure is to use spoken utterances generated with arbitrary text and various utterance conditions as input for speech recognition to objectively verify speech recognition results.

Another aspect of the present disclosure is to generate spoken utterances using database containing arbitrary text and various utterance conditions, and to use the generated spoken utterances as input for speech recognition to verify speech recognition results more precisely and broadly.

Another aspect of the present disclosure is to address the failure of the related art to objectify speech recognition verification by using optimal process resources.

DETAILED DESCRIPTION OF THE INVENTION

According to an embodiment of the present disclosure, the speech recognition verification method may include performing speech recognition by using as input, spoken utterances generated using an arbitrary text and various utterance conditions, and verifying speech recognition results through comparison between the text used as the input for speech recognition and the text being outputted as a result of speech recognition.

More specifically, the speech recognition verification method according to an embodiment of the present disclosure may include converting a verification target text item to a verification target spoken utterance by applying a preset utterance condition, analyzing the verification target spoken utterance and outputting a recognition result text item corresponding to an analysis result, and verifying speech recognition performance through a comparison between a verification target text item and the recognition result text item.

Through the speech recognition verification method according to the present embodiment, speech recognition results may be objectively verified using spoken utterances generated with an arbitrary text and various utterance conditions as input for speech recognition.

Further, the converting may include converting the verification target text item to a preprocessed speech; applying a preset utterance condition to the preprocessed speech; and outputting the preprocessed speech, to which the preset utterance condition has been applied, as the verification target spoken utterance.

Further, the applying may include applying a first utterance condition as a speech feature parameter for modifying a feature of the preprocessed speech; and applying a second utterance condition as a speaker feature parameter for modifying the speaker's voice uttering the preprocessed speech.

Further, the outputting of the verification target spoken utterance may include outputting a result as a verification target spoken utterance, the result of synthesizing the preprocessed speech to which the first utterance condition is applied, and the preprocessed speech to which the second utterance condition is applied.

According to the present embodiment, through the converting, the applying, and the outputting of the verification target spoken utterance, spoken utterances may be generated using database containing arbitrary text and various utterance conditions, and the spoken utterances thus generated may be used as input for speech recognition to verify speech recognition results more precisely and broadly.

Further, the converting may include converting the verification target text item to the preprocessed speech, generating a speech spectrogram corresponding to a frequency range of the preprocessed speech, applying a preset utterance condition to the speech spectrogram, and outputting the speech spectrogram to which the utterance condition is applied as a verification target spoken utterance.

In addition, the applying may include applying to the speech spectrogram a first utterance condition as a speech feature parameter for modifying a feature of speech, and applying to the speech spectrogram a second utterance condition as a speaker feature parameter for modifying the speaker's voice uttering the speech.

In addition, the outputting of the verification target spoken utterance may include synthesizing a synthesized speech spectrogram by combining a speech spectrogram to which the first utterance condition is applied and a speech spectrogram to which the second utterance condition is applied.

In addition, the outputting of the verification target spoken utterance may include converting the synthesized speech spectrogram to a linear spectrogram, converting the linear spectrogram to a speech waveform, and outputting the speech waveform as verification target spoken utterance.

Through the converting, the applying, and the outputting of verification target spoken utterance according to the present embodiment, various algorithms for text-to-speech conversion may be used to generate spoken utterances, and the spoken utterances thus generated may be used as input for speech recognition to enable more precise and broader verification of speech recognition results.

The speech recognition verification device according to an embodiment of the present disclosure may include a speech synthesis module for applying a preset utterance condition to convert a verification target text item to a verification target spoken utterance, a speech recognition module for analyzing the verification target spoken utterance and outputs a recognition result text item corresponding to an analysis result, and a speech recognition verification module for verifying speech recognition performance through comparison between the verification target text item and the recognition result text item.

Through the speech recognition verification device according to the present embodiment, spoken utterances generated with arbitrary text and various utterance conditions may be used as input for speech recognition to objectively verify speech recognition results.

In addition, the speech synthesis module may include a converter which converts the verification target text item to preprocessed speech, an applicator which applies a preset utterance condition to the preprocessed speech, and an output unit which outputs, as verification target spoken utterance, the preprocessed speech to which the preset utterance condition is applied.

In addition, the applicator may be configured to apply a first utterance condition as a speech feature parameter capable of modifying a feature of the preprocessed speech, and to apply a second utterance condition as a speaker feature parameter capable of modifying the speaker's voice uttering the preprocessed speech.

In addition, the output unit may be configured to output, as the verification target spoken utterance, a result of combining the preprocessed speech to which the first utterance condition is applied, and the preprocessed speech to which the second utterance condition is applied.

Through the speech synthesis module, the applicator, and the output unit according to the present embodiment, by using database containing arbitrary text and various utterance conditions, spoken utterances may be generated, and the spoken utterances thus generated may be used as input for speech recognition to verify speech recognition results more precisely and broadly.

In addition, the speech synthesis module includes a converter which converts the verification target text item to preprocessed speech, an applicator which generates a speech spectrogram corresponding to a frequency range of the preprocessed speech and applies a preset utterance condition to the speech spectrogram, and an output unit which outputs the speech spectrogram to which the utterance condition is applied, as the verification target spoken utterance.

In addition, the applicator is configured to apply a first utterance condition as a speech feature parameter capable of modifying a feature of the preprocessed speech, and to apply a second utterance condition as a speaker feature parameter capable of modifying the speaker's voice uttering the speech.

In addition, the output unit may be configured to synthesize a synthesized speech spectrogram by combining the preprocessed speech to which the first utterance condition is applied and the preprocessed speech to which the second utterance condition is applied.

In addition, the output unit is configured to convert the synthesized speech spectrogram to a linear spectrogram, convert the linear spectrogram to a speech waveform, and output the speech waveform as the verification target spoken utterance.

According to the present embodiment, through the speech synthesis module, the application module, and the output module, spoken utterances may be generated using various algorithms for text-to-speech conversion, and the spoken utterances thus generated may be used as input for speech recognition to enable more precise and broad verification of speech recognition results.

According to the present disclosure, spoken utterances generated with random text and various utterance conditions may be used as input of speech recognition to objectively verify speech recognition results.

Further, the database containing arbitrary text and various utterance conditions may be used to generate spoken utterances, and the spoken utterances thus generated may be used as input for speech recognition to enable more precise and broad verification of speech recognition results.

Further, the spoken utterances generated with various utterance conditions by using optimal processor resources may be used as input for speech recognition to enable objective verification of speech recognition results, thus improving power efficiency of the speech recognition verification device.

Furthermore, the speech recognition verification device, in spite of being a uniform mass-produced product, allows a user to perceive it as a personalized device, and thus can create the effect of a user-customized product.

Advantages of the present disclosure are not limited to those described in the embodiments of the present disclosure, and other advantages from the following description. Furthermore, other advantages will be more clearly understood by those having ordinary skill in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE INVENTION

Figure 1:
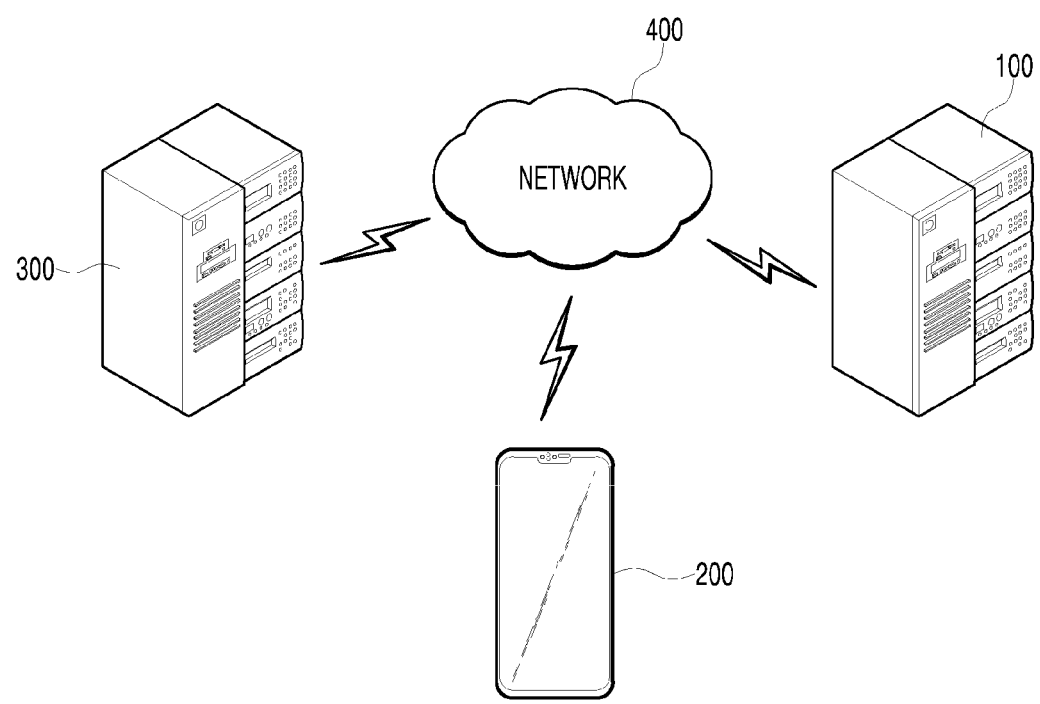
FIG. 1 is a diagram illustrating a speech recognition verification environment according to an embodiment of the present disclosure, including a speech recognition verification device, a user terminal, a server, and a network connecting the speech recognition verification device, the user terminal, and the server to one another.

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if so deemed that such details are not necessary to obtain a complete understanding of the present disclosure.

The terminology used herein is used for the purpose of describing particular embodiments, and is not intended to limit the scope of the present disclosure. The singular forms include the plural references unless the context clearly dictates otherwise. Throughout the present specification, the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components. The terms such as "first," "second," and other numerical terms may be used herein only to describe various elements, but these elements should not be limited by these terms. These terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repetitive description of the common elements will be omitted.

FIG. 1 is a diagram illustrating a speech recognition verification environment according to an embodiment of the present disclosure, including a speech recognition verification device, a user terminal, a server, and a network connecting the speech recognition verification device, the user terminal, and the server to one another. Illustrated in FIG. 1 is a state in which a speech recognition verification device 100, a user terminal 200, and a server 300 are communicatively connected to one another via a network 400. The speech recognition verification device 100, the user terminal 200, and the server 300 may be connected to one another in a 5G communication environment. In addition, other than the devices illustrated in FIG. 1, various other electronic devices for use at home or office may be connected to each other and operate in an Internet-of-Things environment.

The speech recognition verification device 100 may convert a verification target text item to a verification target spoken utterance by applying a preset utterance condition, may analyze the verification target spoken utterance, may output a recognition result text item corresponding to an analysis result, and may verify speech recognition performance through comparison between the verification target text item and the recognition result text item.

In the present embodiment, in converting the verification target text item to the verification target spoken utterance, the speech recognition verification device 100 may convert the verification target text item to preprocessed speech, apply a preset utterance condition to the preprocessed speech, and output as the verification target spoken utterance, the preprocessed speech to which the utterance condition is applied.

Here, the preset utterance condition may include control parameters which can be applied to output various verification target spoken utterances. In the present embodiment, the preset utterance condition may include a first utterance condition and a second utterance condition. The first utterance condition is a speech feature parameter for modifying a feature of the verification target spoken utterance, and may include emotions (anger, happiness, etc.), accents, speed, loudness, personal mannerisms in speech, diction, etc., that are built in the database (110 of FIG. 2). Further, the second utterance condition may be a speaker feature parameter which can be applied to vary the speaker's voice uttering a verification target spoken utterance, and may include parameters built in the database (110 of FIG. 2) such as voices of teenage men, voices of women in their twenties, voices of men in their thirties, voices of women in their seventies, and so forth.

In the present embodiment, when converting the verification target text item to the verification target spoken utterance, the speech recognition verification device 100 may convert the verification target text item to a preprocessed speech, apply a preset utterance condition to the preprocessed speech, and output the preprocessed speech to which the utterance condition is applied, as the verification target spoken utterance.

In some embodiments, when converting the verification target text item to the verification target spoken utterance, the speech recognition verification device 100 may convert the verification target text item to a preprocessed speech, generate a speech spectrogram corresponding to a frequency of the preprocessed speech, apply a preset utterance condition to the speech spectrogram, and output the speech spectrogram to which the utterance condition is applied, as the verification target spoken utterance.

The user terminal 200 may connect to a speech recognition verification application or a speech recognition verification site to monitor the status information of the speech recognition verification device 100 through an authentication process, or may be provided with a service for operating or controlling the speech recognition verification device 100. In the present embodiment, the user terminal 200, upon completing the authentication process, may select the verification target text item to be subjected to speech recognition verification, may select the first utterance condition and/or the second utterance condition, and may receive speech recognition verification results being outputted by the speech recognition verification device 100

In the present embodiment, the user terminal 200 may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. In addition, the user terminal 200 may be a wearable terminal implemented with communication function and data processing function, in the form of a watch, glasses or goggles, a hairband, a ring, or the like. The user terminal 200 is not limited to the aforementioned items, but may be any terminal capable of web-browsing.

The server 300 may be a database server which provides big data required for applications of various artificial intelligence algorithms, data for operating the speech recognition verification device 100, and the like. Furthermore, the server 300 may include a web server or application server which enables remote control of the speech recognition verification device 100 by using a speech recognition verification application or a speech recognition verification device web browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, AI does not exist on its own, but is rather directly or indirectly related to a number of other fields in computer science. Particularly in recent years, there have been numerous attempts to introduce an element of AI into various fields of information technology to solve problems of the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than executing rigidly set static program commands, may take an approach that builds a specific model based on input data for deriving a prediction or decision.

The server 300 may transmit/receive signals with the speech recognition verification device 100 and/or the user terminal 200. The server 300 may receive a verification target text item and utterance condition select signals received from the user terminal 200 and transfer the same to the speech recognition verification device 100. The server 300 may receive a verification target spoken utterance generated by the speech recognition verification device 100 using verification text and an utterance condition that the user terminal 200 has selected. The server 300 may analyze the verification target spoken utterance and may transmit recognition result text item corresponding to the analysis result to the speech recognition verification device 100. The speech recognition verification device 100 may verify speech recognition performance by comparing the recognition result text item received from the server 300 and the verification target text item selected by the user terminal 200. In other words, the process of speech recognition processing may be executed by the server 300.

Depending on the processing capability of the speech recognition verification device 100, the following processes may be at least in part executed by the speech recognition verification device 100: converting the verification target text item to a verification target spoken utterance by applying the preset utterance condition; analyzing the verification target spoken utterance and outputting a recognition result text item corresponding to an analysis result; and verifying speech recognition performance by comparison between the verification target text item and the recognition result text item.

The network 400 may serve to connect the speech recognition verification device 100, the user terminal 200, and the server 300 to each other. The network 400, for example, includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. In addition, the network 400 may transmit or receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet, as well as a private network such as a secure corporate private network, for example, a multiple network environment. Access to the network 400 may be provided through one or more wire-based or wireless access networks. Further, the network 400 may support 5G communication and/or an Internet of things (IoT) network for exchanging and processing information between distributed components such as objects.

Figure 2:
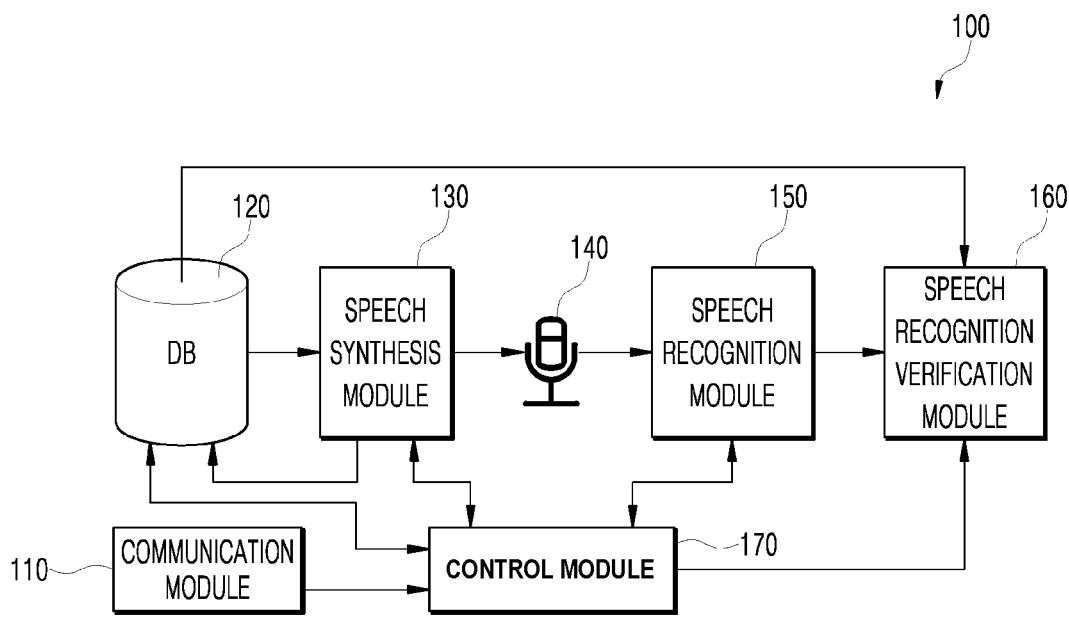
FIG. 2 is a schematic block diagram of a speech recognition verification device according to an embodiment of the present disclosure.
Figure 3:
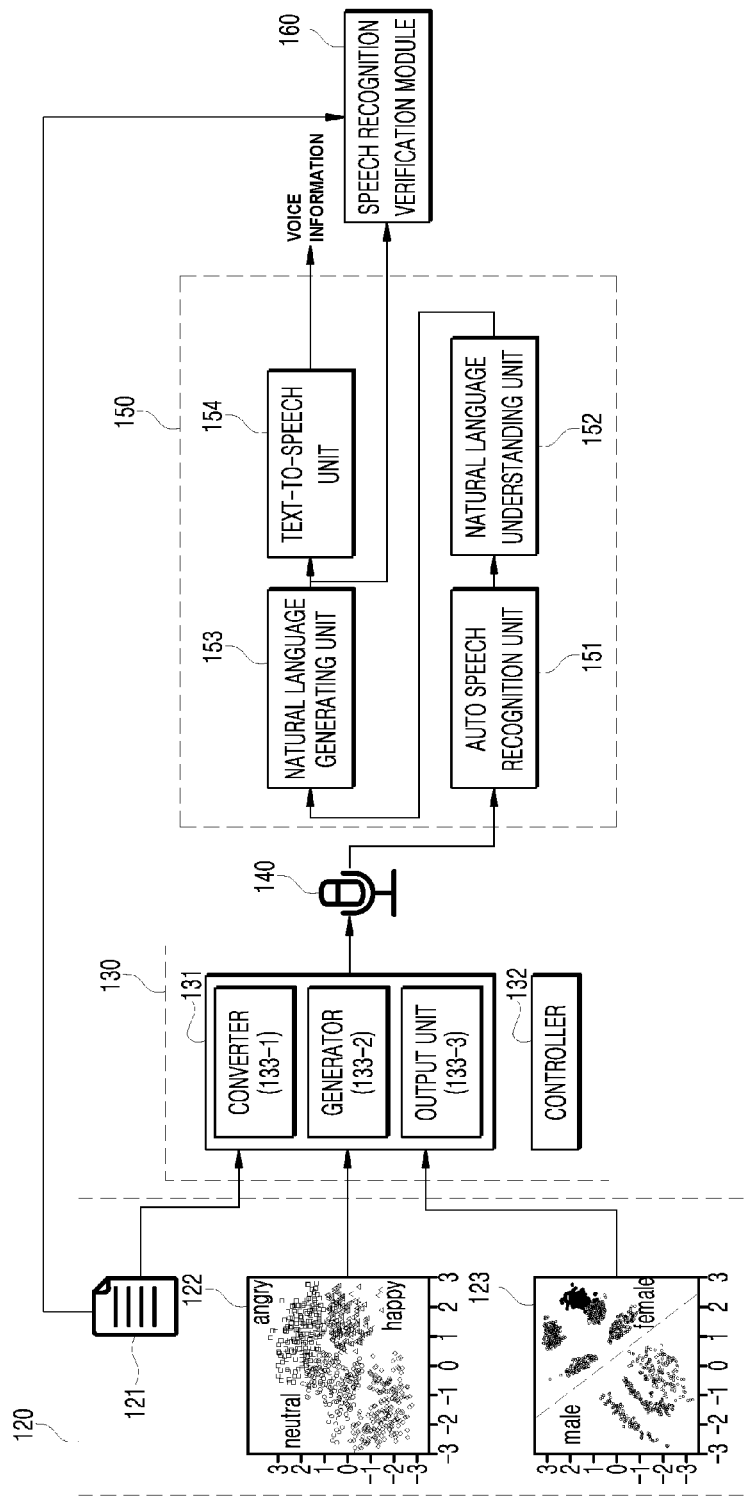
FIG. 3 is a detailed block diagram of database, a speech synthesis module, and a speech recognition module of the speech recognition verification device shown in FIG. 2.

FIG. 2 is a schematic block diagram of a speech recognition verification device according to an embodiment of the present disclosure. FIG. 3 is detailed block diagrams of the database, the speech synthesis module, and the speech recognition module in the speech recognition verification device shown in FIG. 2. Hereinbelow, a description of the common parts previously described with reference to FIG. 1 will be omitted to avoid repetitive description.

Referring to FIG. 2 and FIG. 3, the speech recognition verification device 100 may include a communication module 110, database 120, a speech synthesis module 130, a microphone 140, a speech recognition module 150, a speech recognition verification module 160, and a control module 170. In the present embodiment, the speech synthesis module 130, the speech recognition module 150, and the speech recognition verification module 160 may be each provided inside the speech recognition verification device 100 or outside the speech recognition verification device 100.

The communication module 110, in connection with the network 400, may provide a communication interface required for providing, as packet data, transmission/reception signals between the speech recognition verification device 100, the user terminal 200, and/or the server 300. In addition, the communication module 110 may support various machine-to-machine communications (internet-of-things (IoT), internet-of-everything (IoE), internet-of-small-things (IoST), etc.), and may also support machine-to-machine (M2M) communication, vehicle-to-everything (V2X) communication, device-to-device (D2D) communication, and the like.

The database 120 may include first database 121 which stores one or more verification target text items for use in speech recognition verification, second database 122 which stores a first utterance condition as one or more speech feature parameters for modifying a feature of the verification target spoken utterance, and third database 123 which stores a second utterance condition as one or more speaker feature parameters for modifying the voice of a speaker uttering the verification target spoken utterance. Here, the speech feature parameters may include emotions, accents, speed, loudness, personal mannerisms in speech, diction, etc., and the speaker feature parameter may include the voices of a preset number of persons, such as voices of teenage men, voices of women in their twenties, voices of men in their thirties, voices of women in their seventies, etc. In the present embodiment, the verification target text item, the first utterance condition, and the second utterance condition stored in the first database 121 to the third database 123 may be received from an external device (a website, a server, etc.) through the communication module 110 under control of the control module 170.

The speech synthesis module 130 may apply a preset utterance condition to convert a a verification target text item to a verification target spoken utterance. In the present embodiment, the speech synthesis module 130 may include a speech synthesizer 131 and a controller 132, and the speech synthesizer 131 may include a converter 131-1, an applicator 131-2, and an output unit 131-3.

The converter 131-1 may convert the verification target text item being inputted from the first database 121 to a preprocessed speech. Speech synthesis technology includes converting inputted text to natural synthesized speech through the processes of language-understanding the inputted text and synthesizing the same into speech, which may be achieved by text-to-speech (TTS). In the present embodiment, the converter 131-1 may include the TTS convertor unit. The converter 131-1 may convert the verification target text item to the preprocessed speech through three stages of language processing, rhythm generation, and waveform synthesis. The converter 131-1 may analyze the syntactic structure of the verification target text item (language processing stage), may generate rhythms as if the verification target text item was read by a human according to the analyzed syntactic structure, and may collect basic units of stored speech database (not illustrated) to generate a synthetic speech according to the generated rhythms. The synthetic speech generated by the converter 131-1 may be referred to as a preprocessed speech.

The applicator 131-2 may apply a preset utterance condition to the preprocessed speech generated by the converter 131-1. The applicator 131-2 may apply the first utterance condition to the preprocessed speech to generate a first preprocessed speech. In addition, the applicator 131-2 may apply the second utterance condition to the preprocessed speech to generate a second preprocessed speech.

Here, the controller 132 may select control signals of the first utterance condition and the second utterance condition, which will be applied by the applicator 131-2, to the database 120. Further, the controller 132 may output a select control signal of the verification target text item to the database 120. The first database 121, having received a select control signal of the controller 132, may output the verification target text item to the speech synthesizer 131. In addition, the second database 132 and the third database 123, having received a select control signal of the controller 132, may output the first utterance condition and the second utterance condition to the speech synthesizer 131.

For example, the applicator 131-2 may apply the first utterance condition (for example, a predetermined speed) to the preprocessed speech to generate a first preprocessed speech. In addition, the applicator 131-2 may apply the second utterance condition (for example, a female voice in her twenties) to the preprocessed speech to generate a second preprocessed speech.

The output unit 131-3 may output the preprocessed speech, to which the preset utterance conditions are applied, as the verification target spoken utterance. The output unit 131-3 may output a result of combining the first preprocessed speech and the second preprocessed speech as the verification target spoken utterance. For example, as described above, the output unit 131-3 may output the verification target text item, uttered at a predetermined speed in a female voice in her twenties, as the verification target spoken utterance.

As described above, the speech synthesizer 131 may output various verification target spoken utterance with respect to the verification target text item by control signals of the controller 132 with respect to the first utterance condition and/or the second utterance condition.

In some embodiments, the applicator 132-1 may generate a speech spectrogram corresponding to a frequency range of the preprocessed speech with respect to the preprocessed speech as a synthesized speech generated in the converter 131-1, and may apply a preset utterance condition to the speech spectrogram.

The applicator 132-1 may subject a preprocessed speech signal to Fourier-transform to obtain the spectrogram with respect to the preprocessed speech signal. Here, the spectrogram is a tool for visualizing speech, which may display the characteristics of both waveform and spectrum. The applicator 132-1 may calculate the fundamental frequency of the preprocessed speech signal through Fourier transformation, and calculate the amplitudes of frequencies corresponding to multiples of the fundamental frequency (whole integers) and generate the spectrum with respect to the preprocessed speech signal, displaying frequencies along the x-axis and amplitudes on the y-axis. The spectrogram may include, a continuous display of the size of amplitudes on each frequency position on the generated spectrum where the size of a bin increases for greater amplitudes and decreases for smaller amplitudes.

The applicator 132-1 may apply the first utterance condition, as a speech feature parameter for modifying a feature of the speech, to the speech spectrogram, and apply the second utterance condition, as a speaker feature parameter for modifying the speaker's voice uttering the speech, to the speech spectrogram.

For example, the applicator 131-2 may apply the first utterance condition (for example, a preset value) to the speech spectrogram to generate a first speech spectrogram. In addition, the applicator 131-2 may apply the second utterance condition (for example, a male voice in his teenage years) to the speech spectrogram to generate a second speech spectrogram.

The output unit 131-3 may output the speech spectrogram to which an utterance condition is applied, as a verification target spoken utterance. The output unit 131-3 may synthesize a synthesized speech spectrogram by combining the first speech spectrogram and the second speech spectrogram in the applicator 131-2.

The output unit 131-3 may output, as the verification target spoken utterance, a result of converting a synthesized speech spectrogram to a linear spectrogram and converting the linear spectrogram to a speech waveform. As an example described previously, the output unit 131-3 may output the verification target text item as a speech spectrogram formed by applying a preset value to the verification target spoken utterance and uttering the same in a male voice in his teenage years.

In the present embodiment, the speech synthesis module 130 may use a Tacotron algorithm to convert the verification target text item to a speech spectrogram, and apply a preset utterance condition to the speech spectrogram to convert the same to a verification target spoken utterance.

Tacotron is a sequence-to-sequence model using recurrent neural network (RNN) encoder-decoder architecture, which may be divided into an encoder (not illustrated) extracting needed information from text (a verification target text item) and a decoder part (not illustrated) synthesizing a speech from the text (a verification target text item) outputted from the encoder.

In the encoder, character embeddings may be used to break down a sentence to character units and encode the same as vectors, and text embedding vector may be outputted through a neural network.

As the neural network, a CBHG module may be used which is a neural network in which a convolutional neural network, a highway network, and a bi-directional recurrent neural network are sequentially stacked.

In the decoder, as an input value at a time step t for a decoder network, the sum of a weighted sum of text encoding vectors and the last decoder output value in a time step t−1 hour. The output value of the decoder may output an R number of vectors at each time step by mel-scale spectrogram. Only the last vector of the R number of vectors may be used as a decoder input value in the next time step. The R number of mel-scale spectrogram vectors generated at each time step are combined in a decoder time step direction, thereby forming the mel-scale spectrogram of the entire synthesized speech, and this spectrogram may be converted to a linear-scale spectrogram through an additional neural network. Next, the linear-scale spectrogram is converted to a waveform through 'Griffin-Lim reconstruction' algorithm, and the converted waveform is written as '~.wav' file, an audio file (verification target spoken utterance).

The microphone 140 may input, to the speech recognition module 150, the verification target spoken utterance being outputted from the speech synthesis module 130.

The speech recognition module 150 may analyze the verification target spoken utterance being inputted through the microphone 140 and output a recognition result text item corresponding to an analysis result. In the present embodiment, the speech recognition module 150 may include an auto speech recognition (ASR) unit 151, a natural language understanding unit 152, a natural language generator 153, and a text-to-speech (TTS) converter 154.

The ASR unit 151 may convert the verification target spoken utterance inputted through the microphone 140 to preprocessed text. For example, the ASR unit 151 may include a speech recognition unit (not illustrated). The speech recognition unit may include an acoustic model and a language model. For example, the acoustic model may include vocalization information, and the language model may include sound unit information and combinations of the sound unit information. The speech recognition unit may apply the vocalization information and the sound unit information to convert the verification target spoken utterance to preprocessed text. The information on the acoustic model and the language model may be stored for example in auto speech recognition database (not illustrated) in the auto speech recognition unit 151.

The natural language understanding unit 152 may perform syntactic analysis or semantic analysis on the preprocessed text outputted from the auto speech recognition unit 151, to figure out the speech intention of the verification target utterance. Here, the syntactic analysis may divide the preprocessed text into grammatical units (examples: word, phrase, and morpheme) and learn what grammatical element is contained in the divided grammatical units. Further, the semantic analysis may be performed by applying semantic matching, rule matching, formula matching, and the like. Accordingly, the natural language understanding unit 152 may obtain the parameters required for discovering the speech intent of the preprocessed text or the parameters required for expressing such speech intent.

The natural language generator 153 may generate, as the text as uttered in natural language, the preprocessed text in which the speech intent of the verification target utterance is reflected. In the present embodiment, the text uttered in natural language generated by the natural language generator 153 may be inputted to the speech recognition verification module 160 as recognition result text item.

The TTS converter 154 may convert the text as uttered in natural language generated by the natural language generator 153 to voice information, and may output the converted voice information through the audio output unit (not illustrated).

The speech recognition verification module 160 may verify speech recognition performance by comparing the verification target text item outputted from first database 121 to the recognition result text item outputted from the natural language generator 153 inside the speech recognition module 150. The speech recognition performance of the speech recognition verification module 160 may increase if the matching rate is high as a result of the comparison between the verification target text item and the recognition result text item; alternatively, the speech recognition performance of the speech recognition verification module 160 may decrease if the matching rate decreases.

The control module 170 is a type of a central processing unit which may drive a control software provided in the memory 170 to control an overall operation of the speech recognition verification device 100. Here, the control module 170 may include devices of all kinds that are capable of processing data, such as a processor. Here, the term 'processor' may refer to a data processing device embedded in hardware, which has a physically structured circuit for performing functions represented as a code or command included in programs. Examples of the data processing device embedded in hardware include processing devices such as a microprocessor, a central processing unit (CPU), a processor core, a multiprocessor, an application-specific integrated circuit (ASIC), a field programmable gate array (FPGA), and the like, but the scope of the present disclosure is not limited thereto.

In the present embodiment, the control module 170, to perform speech recognition verification, may control such that machine learning such as deep learning is performed to generate various verification target spoken utterances with respect to the verification target text item, and the memory may store therein data to be used in machine learning, result data, and so forth.

Deep learning, which is a subfield of machine learning, enables data-based learning to a deep level through multiple layers. As the number of layers in deep learning increases, the deep learning may acquire a collection of machine learning algorithms extracting core data from a plurality of data sets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is heavily used in natural language processing and is a structure effective in processing time-series data that vary over a course of time, and may form an artificial neural network structure by building up layers at each instant. DBN includes a deep learning structure formed by stacking up multiple layers of restricted Boltzmann machines (RBM), which is a deep learning technique. Once a certain number of layers are formed by repeating RBM training, a DBN having the same number of layers can be formed. CNN includes a model mimicking a human brain function, built on the basis of the assumption that, when a person recognizes an object, the object is recognized as a result of complex processing in the brain after basic features of the object are extracted.

Meanwhile, the artificial neural network can be trained by adjusting connection weights between nodes (if necessary, adjusting bias values as well) so as to produce a desired output from a given input. In addition, the artificial neural network can continuously update the weight values through learning. Furthermore, methods such as back propagation may be used in training the artificial neural network.

The control module 170 may include a deep neural network (DNN) such as CNN, RNN, DBN, and the like, and may train the DNN to control such that verification target spoken utterances are generated by applying preset conditions. As a machine learning method for such an artificial neural network, both unsupervised learning and supervised learning may be used. The control module 170 may control such that the architecture of the artificial neural network structure is updated after training according to the settings.

Figure 4:
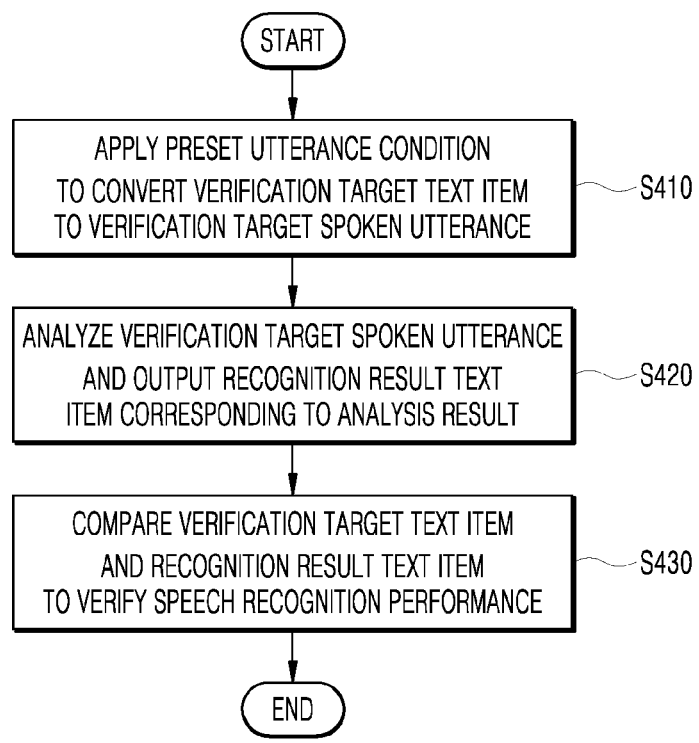
FIG. 4 is a flowchart of a speech recognition verification method according to an embodiment of the present disclosure.

FIG. 4 is a flowchart of a speech recognition verification method according to an embodiment of the present disclosure. In the following description, the parts previously described with reference to FIG. 1 and FIG. 3 will not be described to avoid repetitive description.

Referring to FIG. 4, in step 410, the speech recognition verification device 100 applies a preset utterance condition to convert the verification target text item to a verification target spoken utterance. The speech recognition verification device 100 may convert the verification target text item to a preprocessed speech, may apply a preset utterance condition to the preprocessed speech, and may output the preprocessed speech, to which the utterance condition is applied, as a verification target spoken utterance. Here, the preset utterance condition may include control parameters which can be applied to output various verification target spoken utterances. In the present embodiment, the preset utterance condition may include a first utterance condition and a second utterance condition. The first utterance condition may be a speech feature parameter which can be applied to vary the characteristics of the verification target spoken utterance, and may include speech feature parameters built in the database (110 of FIG. 2) such as emotions, inflections, speed, loudness, accents, pronunciations, and the like. Further, the second utterance condition may be a speaker feature parameter which can be applied to vary the voice of the speaker uttering a verification target spoken utterance, and may include parameters built in the database (110 of FIG. 2) such as male voices in their teens, female voices in their twenties, male voices in their thirties, female voices in their seventies, and so forth. The speech recognition verification device 100 may synthesize a synthesized speech spectrogram by combining the preprocessed speech to which the first utterance condition is applied, and the preprocessed speech to which the second utterance condition is applied; and may output a result of synthesizing the synthesized speech spectrogram as a verification target spoken utterance.

In some embodiments, the speech recognition verification device 100 converts the verification target text item to preprocessed speech, generates a speech spectrogram corresponding to the frequency range of the preprocessed speech, applies the preset utterance condition to the speech spectrogram, and outputs the speech spectrogram, to which the utterance condition has been applied, as a verification target spoken utterance. The speech recognition verification device 100, to the speech spectrogram, applies the first utterance condition as a speech feature parameter for modifying the characteristics of voice; applies, to the speech spectrogram, the second utterance condition as a speaker feature parameter for modifying speaker's voice uttering the speech; and synthesizes a synthesized speech spectrogram by combining the speech spectrogram to which the first utterance condition is applied, and the speech spectrogram to which the second utterance condition is applied. The speech recognition verification device 100 may convert the synthesized speech spectrogram to a linear spectrogram, and after converting the linear spectrogram to a speech waveform, may output the speech waveform as a verification target spoken utterance.

In step S420, the speech recognition verification device 100 may analyze the verification target spoken utterance and output recognition result text item corresponding to the analysis result. The speech recognition verification device 100 may convert the verification target spoken utterance to preprocessed text, and learn the speaker's intent in the verification target spoken utterance, and applies the learned intent to the preprocessed text to generate text in the form of a natural language utterance as recognition result text item.

In step S430, the speech recognition verification device 100 verifies speech recognition performance through comparison between the verification target text item and the recognition result text item.

In step S430, the speech recognition verification device 100 verifies the speech recognition performance by comparing the verification target text item being outputted from database to the recognition result text item in the form of a natural language utterance. The speech recognition performance of the speech recognition verification module 100 may increase if a matching rate resulted from the comparison between the verification target text item and the recognition result text item is high; alternatively, the speech recognition performance of the speech recognition verification module 100 may decrease if the matching rate decreases.

The embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. In addition, it should be understood that any numerical range recited herein is intended to include all sub-ranges subsumed therein (unless expressly indicated otherwise) and therefore, the disclosed numeral ranges include every individual value between the minimum and maximum values of the numeral ranges.

In addition, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. In addition, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A speech recognition verification method, comprising:
converting, by a speech recognition verification device, a verification target text item to a verification target spoken utterance by applying a preset utterance condition;
analyzing, by the speech recognition verification device, the verification target spoken utterance and outputting a recognition result text item corresponding to an analysis result; and
verifying, by the speech recognition verification device, a speech recognition performance through comparison between the verification target text item and the recognition result text item,
wherein the converting includes:
converting the verification target text item to a preprocessed speech;
applying a preset utterance condition to the preprocessed speech; and
outputting, as the verification target spoken utterance, the preprocessed speech to which the preset utterance condition is applied.

2. The speech recognition verification method of claim 1, wherein the applying includes:
applying a first utterance condition as a speech feature parameter capable of modifying a feature of the preprocessed speech; and
applying a second utterance condition as a speaker feature parameter capable of modifying speaker's voice uttering the preprocessed speech.

3. The speech recognition verification method of claim 2, wherein the outputting as the verification target spoken utterance includes outputting, as the verification target spoken utterance, a result of combining the preprocessed speech to which the first utterance condition is applied, and the preprocessed speech to which the second utterance condition is applied.

4. A non-transitory computer readable storage medium, wherein a computer program is stored in the non-transitory computer readable storage medium and the computer program, when executed by a processor, causes at least one processor to perform the method of claim 1.

5. A speech verification method, comprising:
converting, by a speech recognition verification device, a verification target text item to a verification target spoken utterance by applying a preset utterance condition;
analyzing, by the speech recognition verification device, the verification target spoken utterance and outputting a recognition result text item corresponding to an analysis result; and
verifying, by the speech recognition verification device, a speech recognition performance through comparison between the verification target text item and the recognition result text item,
wherein the converting includes:
converting the verification target text item to a preprocessed speech;
generating a speech spectrogram corresponding to a frequency range of the preprocessed speech;
applying a preset utterance condition to the speech spectrogram; and
outputting, as the verification target spoken utterance, the speech spectrogram to which the utterance condition is applied.

6. The speech recognition verification method of claim 5, wherein the applying includes:

applying to the speech spectrogram a first utterance condition as a speech feature parameter capable of modifying a feature of the preprocessed speech; and applying to the speech spectrogram a second utterance condition as a speaker feature parameter capable of modifying speaker's voice uttering the speech.

7. The speech recognition verification method of claim 5, wherein the outputting of the verification target spoken utterance includes synthesizing a synthesized speech spectrogram by combining the speech spectrogram to which the first utterance condition is applied, and the speech spectrogram to which the second utterance condition is applied.

8. The speech recognition verification method of claim 7, wherein the outputting of the verification target spoken utterance includes:

converting the synthesized speech spectrogram to a linear spectrogram;

converting the linear spectrogram to a speech waveform; and outputting the speech waveform as the verification target spoken utterance.

9. A speech recognition verification device, comprising:

at least one processor configured to:

convert a verification target text item to a verification target spoken utterance by applying a preset utterance condition;

analyze the verification target spoken utterance and output a recognition result text item corresponding to an analysis result; and verify speech recognition performance through comparison between the verification target text item and the recognition result text item, wherein the at least one processor is further configured to, when converting a verification target text item:

convert the verification target text item to a preprocessed speech;

apply a preset utterance condition to the preprocessed speech; and output, as the verification target spoken utterance, the preprocessed speech to which the preset utterance condition is applied.

10. The speech recognition verification device of claim 9, wherein the at least one processor is further configured to, when applying a present utterance condition to the preprocessed speech:

apply a first utterance condition as a speech feature parameter capable of modifying a feature of the preprocessed speech and to apply a second utterance condition as a speaker feature parameter capable of modifying the voice of a speaker uttering the preprocessed speech.

11. The speech recognition verification device of claim 10, wherein the at least one processor is further configured to, when outputting the preprocessed speech:

output, as the verification target spoken utterance, a result of synthesizing a synthesized speech spectrogram by combining the preprocessed speech to which the first utterance condition is applied, and the preprocessed speech to which the second utterance condition is applied.

12. The speech recognition verification device of claim 9, wherein the at least one processor is further configured to, when converting a verification target text item:

convert the verification target text item to a preprocessed speech;

generate a speech spectrogram corresponding to a frequency range of the preprocessed speech and apply a preset utterance condition to the speech spectrogram; and output, as the verification target spoken utterance, the speech spectrogram to which the utterance condition is applied.

13. The speech recognition verification device of claim 12, wherein the at least one processor is further configured to, when applying a preset utterance condition to the speech spectrogram:

apply a first utterance condition as a speech feature parameter capable of modifying a feature of the preprocessed speech, and to apply a second utterance condition as a speaker feature parameter capable of modifying the voice of a speaker uttering the preprocessed speech.

14. The speech recognition verification device of claim 13, wherein the at least one processor is further configured to, when outputting the processed speech:

synthesize a synthesized speech spectrogram by combining the preprocessed speech to which the first utterance condition is applied and the preprocessed speech to which the second utterance condition is applied.

15. The speech recognition verification device of claim 14, wherein the at least one processor is further configured to, when outputting the processed speech:

convert the synthesized speech spectrogram to a linear spectrogram, convert the linear spectrogram to a speech waveform, and output the speech waveform as the verification target spoken utterance.

\* \* \* \* \*